US011418998B2

(12) United States Patent
Zee et al.

(10) Patent No.: US 11,418,998 B2
(45) Date of Patent: Aug. 16, 2022

(54) WIRELESS DEVICE, NETWORK NODE, CORE NODE AND METHODS FOR HANDLING RADIO COMMUNICATION OF DATA

(71) Applicant: Telefonaktiebolaget LM Ericsson (publ), Stockholm (SE)

(72) Inventors: Oscar Zee, Stockholm (SE); Ann-Christine Eriksson, Enköping (SE); Paul Mihkel Teder, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/047,531

(22) PCT Filed: Apr. 17, 2018

(86) PCT No.: PCT/SE2018/050386
§ 371 (c)(1),
(2) Date: Oct. 14, 2020

(87) PCT Pub. No.: WO2019/203700
PCT Pub. Date: Oct. 24, 2019

(65) Prior Publication Data
US 2021/0153068 A1 May 20, 2021

(51) Int. Cl.
*H04W 28/02* (2009.01)
*H04W 48/12* (2009.01)
*H04W 68/02* (2009.01)

(52) U.S. Cl.
CPC ... *H04W 28/0268* (2013.01); *H04W 28/0252* (2013.01); *H04W 48/12* (2013.01); *H04W 68/02* (2013.01)

(58) Field of Classification Search
CPC .. H04W 28/0268; H04W 48/12; H04W 68/02
See application file for complete search history.

(56) References Cited

U.S. PATENT DOCUMENTS 10,356,750 B2 * 7/2019 Zarifi ............. H04W 76/11
11,140,739 B2 * 10/2021 Haneji ............ H04W 76/25
(Continued)

FOREIGN PATENT DOCUMENTS

EP 1781057 A1 5/2007
EP 2448192 A1 5/2012
(Continued)

OTHER PUBLICATIONS

International Search Report and Written Opinion of the International Searching Authority for PCT International Application No. PCT/SE2018/050386 dated Feb. 18, 2019.
(Continued)

*Primary Examiner* — Parth Patel
(74) *Attorney, Agent, or Firm* — Sage Patent Group

(57) ABSTRACT

A wireless device, a network node, a core node and methods for handling radio communication of data between the wireless device and the network node in a wireless network. The network node transmits system information related to availability of a potential data bearer dedicated for data tolerating a certain delivery delay, which is received by the wireless device in idle or inactive mode. The wireless device determines whether the potential data bearer is available, based on the system information. When available, the wireless device initiates a transition from idle/inactive mode to connected mode and communicates the data over the potential data bearer. When the potential data bearer is unavailable, the wireless device stays in the idle/inactive mode. When the data is downlink data, the core node sends a paging message indicating a potential data class.

20 Claims, 8 Drawing Sheets

(56) References Cited

U.S. PATENT DOCUMENTS

| | | | | |
|---|---|---|---|---|
| 2009/0270030 A1* | 10/2009 | Jia | H04W 48/16 | 455/39 |
| 2013/0051326 A1* | 2/2013 | Jeyatharan | H04L 47/824 | 370/328 |
| 2013/0148607 A1* | 6/2013 | Yu | H04L 61/103 | 370/329 |
| 2014/0099914 A1* | 4/2014 | Ngai | H04W 36/0085 | 455/405 |
| 2015/0282213 A1* | 10/2015 | Sun | H04W 74/0833 | 370/329 |
| 2015/0319701 A1* | 11/2015 | Ng | H04L 5/005 | 370/311 |
| 2016/0295504 A1* | 10/2016 | Wang | H04W 72/0473 | |
| 2016/0353342 A1* | 12/2016 | Futaki | H04W 36/0085 | |
| 2017/0094589 A1* | 3/2017 | Bhasin | H04W 48/18 | |
| 2017/0374644 A1* | 12/2017 | Ryu | H04W 76/27 | |
| 2018/0242136 A1* | 8/2018 | Lu | H04W 8/02 | |
| 2018/0279229 A1* | 9/2018 | Dinan | H04W 52/367 | |
| 2018/0368090 A1* | 12/2018 | Kadambar | H04W 76/14 | |
| 2019/0007884 A1* | 1/2019 | Koskinen | H04W 28/20 | |
| 2019/0037636 A1* | 1/2019 | Kim | H04W 60/00 | |
| 2019/0053162 A1* | 2/2019 | Islam | H04W 52/0229 | |
| 2019/0098697 A1* | 3/2019 | Fujishiro | H04W 40/12 | |
| 2019/0132900 A1* | 5/2019 | Hong | H04W 28/0215 | |
| 2019/0200249 A1* | 6/2019 | Yoon | H04L 5/0057 | |
| 2019/0222367 A1* | 7/2019 | Tseng | H04L 5/001 | |
| 2019/0305840 A1* | 10/2019 | Cirik | H04W 72/085 | |
| 2019/0306842 A1* | 10/2019 | Cirik | H04B 7/0617 | |
| 2019/0306848 A1* | 10/2019 | Zhou | H04W 72/042 | |
| 2019/0312619 A1* | 10/2019 | Abedini | H04B 17/382 | |
| 2019/0342853 A1* | 11/2019 | Li | H04W 68/02 | |
| 2019/0349883 A1* | 11/2019 | Fujishiro | H04W 76/11 | |
| 2019/0357298 A1* | 11/2019 | Li | H04W 64/006 | |
| 2020/0015196 A1* | 1/2020 | Sivavakeesar | H04W 36/0055 | |
| 2020/0229180 A1* | 7/2020 | Liu | H04W 72/0453 | |
| 2020/0245180 A1* | 7/2020 | Matsukawa | H04W 28/0215 | |
| 2020/0287638 A1* | 9/2020 | Zhao | H04L 5/005 | |
| 2020/0288338 A1* | 9/2020 | Freda | H04W 76/27 | |
| 2020/0304985 A1* | 9/2020 | Gupta | H04W 80/10 | |
| 2021/0153068 A1* | 5/2021 | Zee | H04W 28/0268 | |

FOREIGN PATENT DOCUMENTS

| | | |
|---|---|---|
| EP | 3182754 A1 | 6/2017 |
| WO | 2009047025 A1 | 4/2009 |
| WO | 2017139910 A1 | 8/2017 |
| WO | 2019083421 A1 | 5/2019 |
| WO | 2019091582 A1 | 5/2019 |

OTHER PUBLICATIONS

Extended European Search Report dated Nov. 2, 2021 for European Patent Application No. 18915061.8, 14 pages.

ZTE: "No Paging Response Handling"; TS 23.401 CR 0130 Change Request; S2-081145; 3GPP TSG-SA2 Meeting #63; Athens, Greece; Feb. 18-22, 2008, 7 pages.

* cited by examiner

WIRELESS DEVICE, NETWORK NODE, CORE NODE AND METHODS FOR HANDLING RADIO COMMUNICATION OF DATA

CROSS REFERENCE TO RELATED APPLICATION

This application is a 35 U.S.C. § 371 national stage application of PCT International Application No. PCT/SE2018/050386 filed on Apr. 17, 2018, the disclosure and content of which is incorporated by reference herein in its entirety.

TECHNICAL FIELD

The present disclosure relates generally to a wireless device, a network node, a core node and methods therein, for handling radio communication of data between the wireless device and the network node in a wireless network.

BACKGROUND

In a wireless network, the amount of available radio resources in terms of frequency spectrum and transmission time is typically limited and it is therefore desirable to utilize the radio resources available in a cell as efficiently as possible so as to achieve high capacity and adequate performance in communication with wireless devices. It is often also desirable to reduce power consumption in battery powered wireless devices so as to minimize the need for charging their batteries.

The term "wireless network" is used in this description to denote any network comprising network nodes such as base stations, access points, eNodeBs or the like which are capable of radio communication with wireless devices, e.g. by transmitting scheduling blocks carrying reference signals and typically also various data and control information. Without limitation, the wireless network discussed herein may be a cellular network with base stations e.g. of a 5G wireless network or a WLAN network with access points. The wireless network is also connected to a core network comprising "core nodes" which are, among other things, configured to execute paging of wireless devices whenever there is downlink data pending in the core network for those wireless devices.

Further, the term "wireless device" is used herein to represent a wireless communications device which could be any communication equipment that is capable of radio communication with a wireless network by sending and receiving radio signals to/from a network node of the wireless network. The wireless device discussed herein may, without limitation, be a mobile telephone, a tablet, a laptop computer or a Machine-to-Machine, M2M, device, also known as Machine Type Communication, MTC, device. Another commonly used generic term in this field is "User Equipment, UE" which could be used herein as a synonym for wireless device.

The wireless network thus comprises a number of network nodes which are operable to communicate radio signals with wireless devices over a radio interface. Depending on the type of network and terminology used, a network node of a wireless network may be referred to as a base station, radio node, E-UTRAN Node B, eNB, 5G node, base transceiver station, WLAN access point, etc. In this disclosure, the term "network node" is used without limitation to any particular type of wireless network.

An example architecture of a wireless network involving an E-UTRAN radio network is shown in FIG. 1, where various logical interfaces between different nodes and entities are illustrated. This is an architecture of the third-generation partnership project (3GPP) Evolved Packet Core (EPC) system. The entities therein include a Mobility Management Entity (MME), a Serving Gateway (S-GW), a PDN Gateway (P-GW) and a Policy and Charging Rules Function (PCRF). Logical interfaces include the interface S1 between E-UTRAN and MME/S-GW, the interface S11 between MME and S-GW, the interface S5/S8 between S-GW and P-GW, the interface Gx between P-GW and PCRF, the interface SGi between P-GW and IP Services, and the interface Rx between PCRF and Services/AF.

It was mentioned above that it is desirable to utilize the available radio resources in a cell efficiently. Another challenge is to make sure that data sent from a data source towards a wireless device arrives "in time" at the wireless device, or conversely that data from the wireless device should arrive in time at a receiving opposite node. Some data is more delay-sensitive than other data, meaning that the delay-sensitive data must arrive at the receiver before a certain deadline after which the data is considered to be more or less useless or the quality of using the data has become too low or at least degraded. There are solutions where users, i.e. of wireless devices, can have different priorities so that data to a high priority user takes precedence in the network over data to a low priority user. The high priority users may also pay a higher fee per transmitted data bit than the low priority users, which means that the cost for transmitting a certain amount of data in terms of utilized radio resources can be deemed higher for the high priority users than for the low priority users.

However, it is a problem that transmission of data may be associated with varying network cost per transmitted data bit for one and the same user, which cost is greatly dependent on the current radio conditions for the user's wireless device. In this description, transmission of data may involve either downlink transmission from a network node to the wireless device or uplink transmission from the wireless device to the network node. This network cost is basically independent of how important it is to get the data across to the receiver in time. As a result, data of less importance may well be equally or even more costly for the network to communicate than data of higher importance.

In this context, the term "cost" mainly refers to how much radio resources are used in a cell or similar, and also to the amount of transmission power needed to reach the wireless device. In more detail, if the radio conditions and resulting signal quality are "poor", e.g. due to the wireless device is located far from the transmitting or receiving network node, higher transmission power is needed which generates interference in the cell, and typically also more coding bits per data bit are needed to ensure correct decoding of the data, either at the wireless device in downlink communication or at the network node in uplink communication. On the other hand, if the radio conditions are "good", such as when the wireless device is close to the network node, considerably lower transmission power and less coding bits are sufficient for successful reception and decoding, resulting in lower network cost per transmitted data bit.

Another factor that could impact the network cost per transmitted data bit is availability of bandwidth such that this cost is deemed to be high when the availability of bandwidth is low, and vice versa. Yet another factor that also may impact the network cost per transmitted data bit is the current traffic load wherein the cost is typically higher at high traffic load than at lower traffic load. It is thus a challenge to ensure that communications between network nodes and wireless devices are executed at lowest possible network cost, so as to improve capacity and performance in the network.

SUMMARY

It is an object of embodiments described herein to address at least some of the problems and issues outlined above. It is possible to achieve this object and others by using a wireless device, a network node, a core node and methods therein, as defined in the attached independent claims.

According to one aspect, a method is performed by a wireless device for handling communication of data between the wireless device and a network node serving a cell of a wireless network. In this method, when the wireless device is in idle or inactive mode, the wireless device receives from the network node system information related to availability of a potential data bearer dedicated for data of a potential data class which indicates that a certain delay for delivering the data can be tolerated. The wireless device further determines whether the potential data bearer is available for communication of the data or not, based on the received system information.

When the potential data bearer is available for communication of the data, the wireless device transmits to the network node, a message of a service request procedure that initiates a transition from the idle or inactive mode to a connected mode, and communicates the data with the network node over the potential data bearer when the wireless device is in the connected mode. On the other hand, when the potential data bearer is not available for communication of the data, the wireless device stays in the idle or inactive mode.

According to another aspect, a wireless device is arranged to handle communication of data between the wireless device and a network node serving a cell of a wireless network. The wireless device is configured to receive from the network node when the wireless device is in idle or inactive mode, system information related to availability of a potential data bearer dedicated for data of a potential data class which indicates that a certain delay for delivering the data can be tolerated. The wireless device is also configured to determine whether the potential data bearer is available for communication of the data or not, based on the received system information.

The wireless device is further configured to transmit to the network node, when the potential data bearer is available for communication of the data, a message of a service request procedure that initiates a transition from the idle or inactive mode to a connected mode, and to communicate the data with the network node over the potential data bearer when the wireless device is in the connected mode. The wireless device is also configured to stay in the idle or inactive mode when the potential data bearer is not available for communication of the data.

According to another aspect, a method is performed by a network node serving a cell of a wireless network, for handling communication of data between the network node and a wireless device. In this method, the network node configures system information related to availability of a potential data bearer dedicated for data of a potential data class which indicates that a certain delay for delivering the data can be tolerated. The network node then transmits the system information in the cell.

The network node further detects whether a message of a service request procedure has been received from the wireless device that initiates a transition from the idle or inactive mode to a connected mode of the wireless device, and communicates the data with the wireless device over the potential data bearer when detecting that said message has been received and the wireless device is in the connected mode.

According to another aspect, a network node is arranged to handle communication of data between the network node and a wireless device when serving a cell of a wireless network. The network node is configured to configure system information related to availability of a potential data bearer dedicated for data of a potential data class which indicates that a certain delay for delivering the data can be tolerated, and to transmit the system information in the cell.

The network node is also configured to detect whether a message of a service request procedure has been received from the wireless device that initiates a transition from the idle or inactive mode to a connected mode of the wireless device, and to communicate the data with the wireless device over the potential data bearer when detecting that said message has been received and the wireless device is in the connected mode.

According to another aspect, a method is performed by a core node associated with a wireless network, for handling communication of data between a wireless device and a network node serving a cell of the wireless network. In this method, the core node obtains downlink data of a potential data class for the wireless device, the potential data class indicating that a certain delay for delivering the data can be tolerated, and sends to the wireless device a paging message indicating that the downlink data is of the potential data class.

The core node further detects whether the potential data bearer is available for communication of the data or not, and communicates the data with the wireless device over the potential data bearer when detecting that the potential data bearer is available.

According to another aspect, a core node is associated with a wireless network and arranged to handle communication of data between a wireless device and a network node serving a cell of the wireless network. The core node is configured to obtain downlink data of a potential data class for the wireless device, the potential data class indicating that a certain delay for delivering the data can be tolerated. The core node is also configured to send to the wireless device a paging message indicating that the downlink data is of the potential data class. The core node is further configured to detect whether the potential data bearer is available for communication of the data or not, and to communicate the data with the wireless device over the potential data bearer when detecting that the potential data bearer is available.

The above wireless device, network node, core node and methods therein may be configured and implemented according to different optional embodiments to accomplish further features and benefits, to be described below.

A computer program is also provided comprising instructions which, when executed on at least one computer in either of the wireless device, the network node and the core node, cause the at least one computer to carry out the respective methods described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
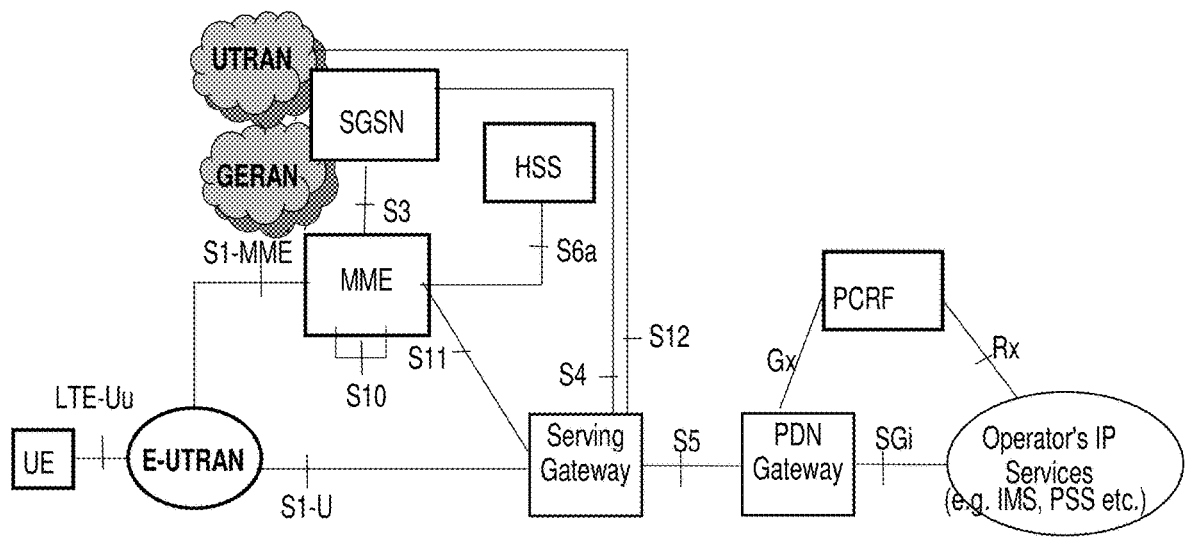
FIG. 1 is a block diagram illustrating an example architecture of an E-UTRAN based wireless network, according to the prior art.

Briefly described, a solution is provided for a wireless network, to enable communication of data between a wireless device and a network node at a reduced cost for the network. This can be accomplished by employing a specific radio bearer, herein denoted "potential data bearer", which is associated with low network cost and dedicated for communication of data of a "potential data class" which indicates that a certain delay can be tolerated for delivering the data, herein denoted "potential data" for short. The solution involves determination whether such a potential data bearer is currently available to the wireless device or not which may depend on the current radio conditions experienced by the device. It would thus be an advantage to utilize the potential data bearer for communication of potential data as much as possible. If the potential data bearer is not available, it may be possible to discard or buffer the data on the sending side and wait until the potential data bearer becomes available again.

In this solution, the wireless device can determine whether the potential data bearer is available for communication of the data or not, based on system information transmitted from the network node, e.g. broadcasted at regular intervals, so that it can be read by the device when in an idle or inactive mode. This system information is related to availability of a potential data bearer and basically dictates the conditions for availability, e.g. depending on a received power measured by the device on downlink reference signals, referred to as Reference Signal Received Power (RSRP), and possibly also depending on a class of the device. When finding that the potential data bearer is available to the wireless device, the device will transmit a message to the network that initiates a transition from the idle/inactive mode to a connected mode such that the data can be communicated over the potential data bearer. In this description, the term "mode" could be replaced by the term "state" which is also commonly used in this field.

There may also be other data bearers available for more delay-sensitive data such as a real-time bearer with highest priority and a semi-real time bearer with medium priority that is higher than for the potential data bearer which has the lowest priority. This way, the data traffic to or from a specific wireless device can be separated based on the data's delay-sensitivity and be transmitted on the respective data bearers.

The current availability of the potential data bearer to the wireless device in a cell may be dependent on whether a network cost associated with the wireless device fulfils a threshold condition or not. The network cost can be estimated, e.g. based on load and measurements as follows. For example, the network cost may be dependent on e.g. the current radio conditions, the current load in the cell, the current amount of free bandwidth or radio resources, the transmit power needed for the transmission and its resulting interference in the present cell and in other neighbouring cells, to mention a few non-limiting examples. Such network costs are recognized as such and have been described and explained above in the background section.

A threshold condition may be that the potential data bearer is deemed available to the wireless device when one or more cost related parameters is/are above or below some predefined threshold value(s). The threshold condition may further comprise calculating some combined or aggregated value using one or more cost related parameters as input to a predefined algorithm, which value is then compared to a predefined threshold value for determination of the potential data bearer's availability. The estimation of network cost may be done in different ways which are however somewhat outside this solution.

When the potential data bearer is found to be available to the wireless device in the cell, any data of the potential data class can be wirelessly communicated to or from the wireless device over the potential data bearer. But when the potential data bearer is not available, e.g. due to high traffic load, lack of free bandwidth/resources, poor radio conditions, etc., any data of the potential data class may be communicated over another data bearer that is intended for real time or semi-real time data that is more or less sensitive to delay. Alternatively, transmission of data of the potential data class can be postponed until the potential data bearer becomes available as long as the data can tolerate such a delay.

Figure 2A:
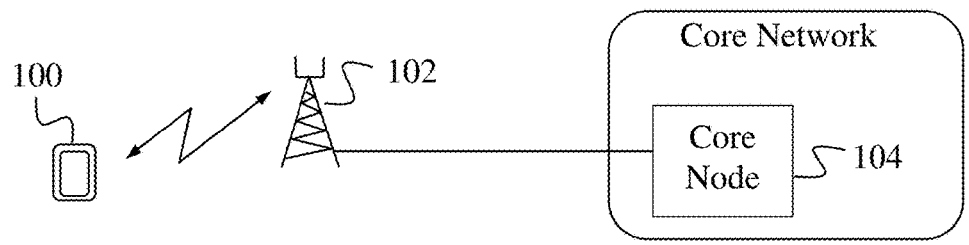
FIG. 2A is a communication scenario involving a wireless device and a network node of a wireless network where the solution may be employed.

A communication scenario where the solution could be employed is illustrated in FIG. 2A involving a wireless device 100 having a radio connection to a serving network node 102 of a wireless network which could also be called a cellular or mobile network depending on the terminology used. The network node 102 is further connected to a core node 104 of a core network. This basic scenario will be referenced in the examples below.

Figure 2B:
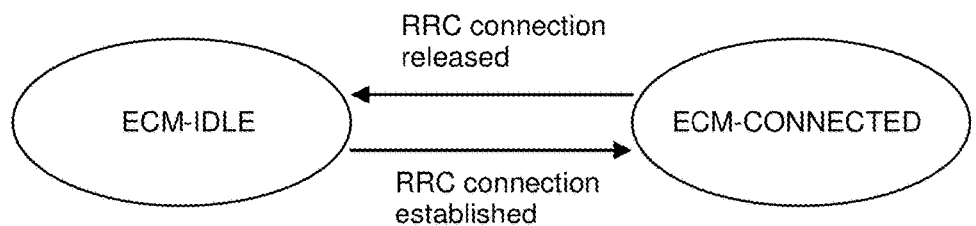
FIG. 2B is an example state diagram illustrating how a wireless device may transit between idle/inactive mode and connected mode.

FIG. 2B is a state diagram illustrating schematically how a wireless device 100 may transit between an idle or inactive mode denoted "ECM-IDLE", and a connected mode denoted "ECM-CONNECTED", where ECM means EPS Connection Management and EPS means Evolved Packet Core. When in the idle or inactive mode, the wireless device 100 is mostly sleeping to save battery and typically wakes up at regular intervals to monitor paging messages and to read certain system information from the network, e.g. when broadcasted by the network node 102. When uplink data is pending in the device or when a paging message is received due to downlink data pending in the network, the wireless device 100 moves from the idle or inactive mode to the connected mode by establishing a Radio Resource Control, RRC, connection with the network node 102. The wireless device 100 may conversely move from the connected mode back to the idle or inactive mode by releasing the RRC connection, e.g. after a period of inactivity.

A wireless device is in ECM-IDLE mode when no Non-Access Stratum (NAS) signaling connection between wireless device and network exists. In ECM-IDLE mode, a wireless device performs cell selection/reselection according to the 3GPP document TS 36.304 and PLMN selection according to the 3GPP document TS 23.122.

Except for wireless devices that have had their RRC connection suspended, there exists no UE context in E-UTRAN for the UE in the ECM-IDLE mode. There is no S1_MME and no S1_U connection for the wireless device in the ECM-IDLE mode.

The wireless device and the MME shall enter the ECM-CONNECTED mode when a signaling connection is established between the wireless device and the MME. Initial NAS messages that initiate a transition from ECM-IDLE to ECM-CONNECTED mode include Attach Request, Tracking Area Update Request, Service Request and Detach Request. A successful completion of a Connection Resume procedure also initiates at wireless device and MME a mode transition of the device from ECM-IDLE to ECM-CONNECTED.

For a wireless device in the ECM-CONNECTED mode, a signaling connection is thus established between the wireless device and the MME. The signaling connection is made up of two parts: an RRC connection and an S1_MME connection.

When a wireless device changes to ECM CONNECTED mode and the network initiates establishment of data radio bearers for data communication, then if a data radio bearer cannot be established, or the wireless device cannot maintain a data radio bearer in the ECM-CONNECTED mode during handovers, the corresponding EPS bearer is deactivated.

When a wireless device returns to the ECM-IDLE mode, all the data radio bearers will be deactivated, and the dedicated RRC signaling connection between the wireless device and its serving network node is also released. This idle/inactive mode condition may cause the following potential problems:

1. The serving network node has no possibility to determine the status of the wireless device, e.g. by receiving Channel Quality Indicator (CQI) information therefrom through a dedicated signaling connection to the wireless device. In case potential data is received from the core network to be transmitted as downlink data, after the wireless device has been located through paging, the entire service request procedure will be executed before determination of whether the potential data should be transmitted over the air or not. This will cause a large amount of signaling overhead in the air interface to no avail in case the potential data is determined not be transmitted.
2. The wireless device has no possibility to determine the status of the potential bearer through the dedicated signaling connection from a network assistance function, as there is no information on which cell the wireless device is currently camped on. In case potential data is pending in the wireless device for uplink transmission, it is not possible to determine if the potential data should be transmitted over the air or not.

Figure 3:
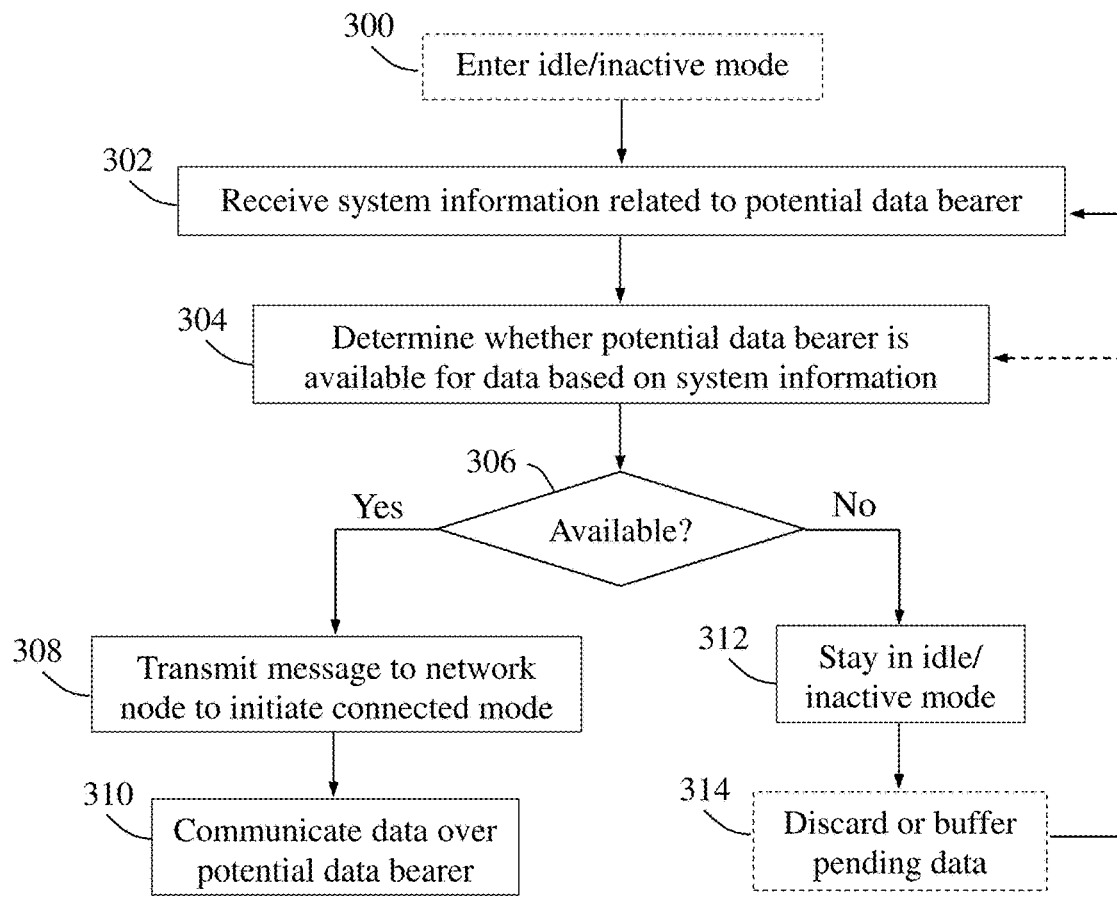
FIG. 3 is a flow chart illustrating a procedure in a wireless device, according to some example embodiments.

An example of how the solution may be employed in terms of actions performed by a wireless device, such as the wireless device 100, is illustrated by the flow chart in FIG. 3, which will be described with further reference to FIG. 2A. FIG. 3 thus illustrates a procedure in the wireless device 100 for handling communication of data between the wireless device and a network node 102 serving a cell of a wireless network. It is assumed that the wireless device 100 is located in this cell and is thereby able to receive and decode radio signals transmitted from the network node 102. The data to be communicated may be either uplink data pending in the wireless device 100 or downlink data pending in the network, and the procedure of FIG. 3 is valid for either of these alternatives. Some more detailed procedures when the data is pending in the device and in the network, respectively, will be described later below with reference to FIGS. 5-8.

A first optional action 300 illustrates that the wireless device 100 enters the above-described idle or inactive mode, e.g. after a prescribed period of inactivity, or it may start operation in the idle or inactive mode after being powered on. A next action 302 illustrates that the wireless device 100 receives from the network node 102, when the wireless device is thus in the idle or inactive mode, system information related to availability of a potential data bearer dedicated for data of a potential data class which indicates that a certain delay for delivering the data can be tolerated.

In another action 304, the wireless device 100 determines whether the potential data bearer is available for communication of the data or not, based on the received system information. The received system information can thus be used by the device 100 to discover availability of the potential data bearer, and some examples of how this could be done will be described later below. The wireless device 100 may also use information about itself for determining availability of the potential data bearer, such as signal measurements related to radio condition and a class of the device 100. The received system information may comprise an algorithm which basically determines availability or not using the device-related information as input.

There are two alternatives after action 304, as indicated by an action 306 where "Yes" indicates that the potential data bearer is found to be available to the wireless device 100, and "No" indicates that the potential data bearer is found to be not available to the wireless device 100, depending on the outcome of action 304. It should be noted that this outcome is largely dependent on the current situation, i.e. more or less in real-time, since the situation may change rapidly e.g. due to changed radio conditions as well as changed traffic in the cell and in neighboring cells. For example, the system information may dictate that the potential data bearer is currently available to any/all devices in the cell, or to devices of a certain class, or to devices for which measured RSRP is above a threshold. The latter threshold may change over time, e.g. due to changed traffic and/or changed interference in the cell and/or in neighbouring cell(s), so that the (broadcasted) system information may accordingly change over time.

When the potential data bearer is available for communication of the data, a following action 308 illustrates that the wireless device 100 transmits to the network node, a message of a service request procedure that initiates a transition from the idle or inactive mode to a connected mode. In this case, the wireless device 100 communicates the data with the network node 102 over the potential data bearer when the wireless device is in the connected mode, as shown in another action 310.

On the other hand, if it is found in action 306 that the potential data bearer is not available for communication of the data, the wireless device 100 stays in the idle or inactive mode as illustrated by an action 312, and the data is consequently not communicated. If the data is uplink data pending in the wireless device 100, this data may be simply discarded or it may be buffered in the wireless device 100 for later transmission, as illustrated by an optional action 314. The process may then return to either action 302 for receiving new system information, or to action 304 for determining the availability status anew, e.g. based on new measurements of RSRP.

Some optional example embodiments that could be used by the wireless device 100 in the procedure of FIG. 3 will now be described.

In some example embodiments, the received system information may comprise at least one of:
 a threshold value of Reference Signal Received Power, RSRP, indicating that the potential data bearer is available when the threshold value is exceeded,
 an indication that the potential data bearer is available for one or more classes of wireless devices, and
 an indication that the potential data bearer is available to any wireless device located in a cell served by the network node.

If the system information comprises the above RSRP threshold value, another example embodiment may be that the wireless device 100 determines whether the potential data bearer is available by checking whether measurements of RSRP at the wireless device exceed said threshold value of RSRP.

In another example embodiment, the system information may be received in a System Information Block SIBx broadcasted by the network node at predetermined intervals. According to regular procedures, the wireless device 100 may first receive a broadcasted Master Information Block MIB that indicates in which radio resource(s) the SIBx is broadcasted. "SIBx" thus denotes a new or modified SIB which has been adapted to include one or more parameters that can be used for determining availability of the potential data bearer.

In further example embodiments, the data may be uplink data initiated by the wireless device. In that case, the following example embodiments may be employed.

In one example embodiment, the wireless device 100 may perform said determining whether the potential data bearer is available repeatedly prior to detecting that the uplink data is pending in the wireless device. An example of how this could be done will be described later below with reference to FIG. 5. In that case, another example embodiment may be that after said determination an application layer in the wireless device is informed whether the potential data bearer is available or not.

Alternatively, another example embodiment could be that the wireless device 100 performs said determining whether the potential data bearer is available after detecting that the uplink data is pending in the wireless device. An example of how this could be done will be described later below with reference to FIG. 6. In that case, another example embodiment may be that the wireless device 100 determines whether the potential data bearer is available or not by transmitting its device class and/or measurements of RSRP at the wireless device to the network node 102, and receiving from the network node an indication that the potential data bearer is available or not. In this embodiment, it is thus the network node 102 that evaluates the potential data bearer availability based on the device class and/or RSRP measurements received from the device 100.

In one example embodiment, the wireless device 100 may discard or buffer the uplink data when staying in idle or inactive mode when the potential data bearer is not available.

In further example embodiments, the data may be downlink data initiated by the network and in this case the wireless device 100 may receive a paging message from a core node 104 associated with the wireless network, the paging message indicating that the paging is caused by pending downlink data of the potential data class. In different other example embodiments, the wireless device 100 may in this case determine whether the potential data bearer is available after receiving the paging message or repeatedly prior to receiving the paging message.

In further example embodiments, said staying in idle or inactive mode when the potential data bearer is not available may comprise that the wireless device 100 omits a response to the paging message, thereby implicitly indicating to the core node that the potential data bearer is not available by absence of a paging response. An example of how this could be implemented will be described later below with reference to FIG. 7. Alternatively, the wireless device 100 may instead send a page response message to the core node with an indication that the potential data bearer is not available. Another example of how this could be implemented will be described later below with reference to FIG. 8.

In the latter case, another example embodiment may be that the page response message comprises a paging periodicity timer instructing the core node 104 to wait with further paging to the wireless device 100 caused by said pending downlink data until the paging periodicity timer has expired. This embodiment could thus be used to avoid a "storm" of paging messages from the core node 104 by requiring a waiting period at the core node 104 between each paging attempt so as to limit the load on the network.

In another example embodiment, when the potential data bearer is available the wireless device 100 may send to the core node a message of a service request procedure that initiates a transition from the idle or inactive mode to the connected mode, as an indication that the potential data bearer is available for communication of the downlink data.

Figure 4A:
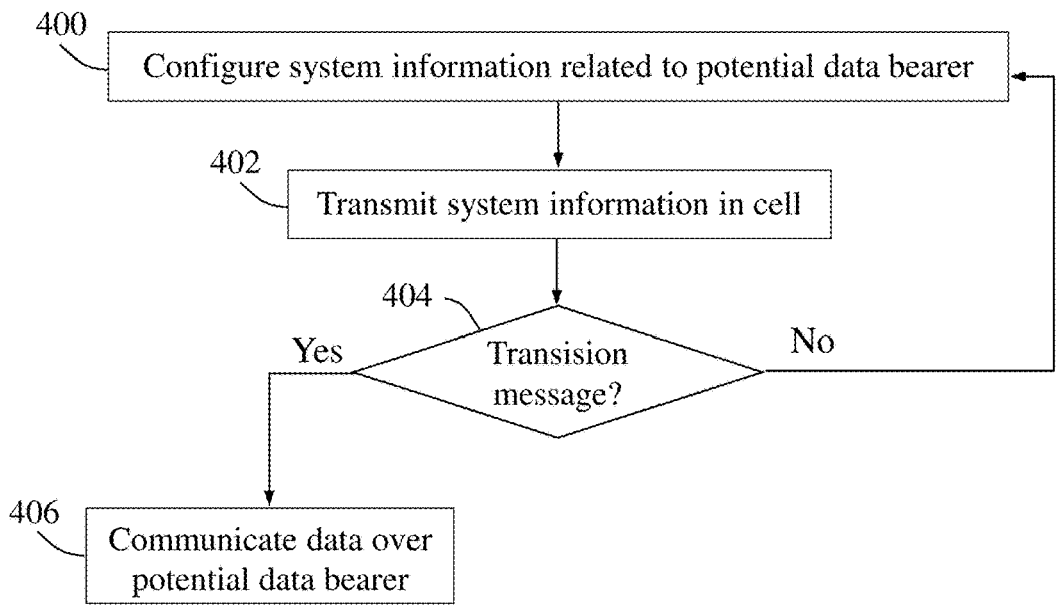
FIG. 4A is another flow chart illustrating a procedure in a network node, according to some example embodiments.

An example of how the solution may be employed in terms of actions performed by a network node, such as the network node 102, is illustrated by the flow chart in FIG. 4A, which will now be described likewise with further reference to FIG. 2A. It should be noted that the procedure of FIG. 4A is likewise valid both for the case when uplink data is pending in the wireless device 100 and for the case when downlink data is pending in the network. Some optional embodiments will be later outlined for either of these communication alternatives.

FIG. 4A thus illustrates a procedure in the network node 102 serving a cell of a wireless network, for handling communication of data between the network node 102 and a wireless device 100. A first action 400 illustrates that the network node 102 configures system information related to availability of a potential data bearer dedicated for data of a potential data class which indicates that a certain delay for delivering the data can be tolerated.

In another action 402, the network node 102 transmits the system information in the cell, e.g. by broadcasting, so that any wireless device that receives this information is able to determine whether the potential data bearer is available or not to the respective device, based on the received information, i.e. in the manner described above for action 304.

It was described above that when finding that the potential data bearer is available the wireless device 100 transmits a message of a service request procedure that initiates a transition to the connected mode, as of action 308. In a next action 404, the network node 102 correspondingly detects whether or not such a message of a service request procedure has been received from the wireless device 100 that initiates a transition from the idle or inactive mode to a connected mode of the wireless device.

When detecting that said message has been received and the wireless device is in the connected mode, the network node 102 communicates the data with the wireless device over the potential data bearer, as shown by an action 406. If action 404 decides that no such message has been received, it means that the network node 102 will not communicate any data over the unavailable potential data bearer and the process may return to action 400 for repetition.

Some optional example embodiments that could be used by the network node 102 in the procedure of FIG. 4A will now be described.

In some example embodiments, the received system information may comprise at least one of:
- a threshold value of Reference Signal Received Power, RSRP, indicating that the potential data bearer is available when the threshold value is exceeded,
- an indication that the potential data bearer is available for one or more classes of wireless devices, and
- an indication that the potential data bearer is available to any wireless device located in a cell served by the network node.

In further example embodiments, the network node 102 may configure the system information in action 400 based on at least one of: the number of active devices in the cell, the number of active devices in one or more neighbouring cells, available bandwidth and/or network resources in the cell, available bandwidth in one or more neighbouring cells, traffic load in the cell, and traffic load in one or more neighbouring cells. One or more of the above factors may thus be used for setting conditions in the system information for availability of the potential data bearer, e.g. in terms of the above-mentioned RSRP threshold value, class(es) of wireless devices or any/all devices being allowed to use the potential data bearer.

In another example embodiment, the network node 102 may broadcast the system information at predetermined intervals in a System Information Block SIBx, which was also mentioned above.

In further example embodiments, the data may be uplink data initiated by the wireless device. In that case, the following example embodiments may be employed.

Figure 4B:
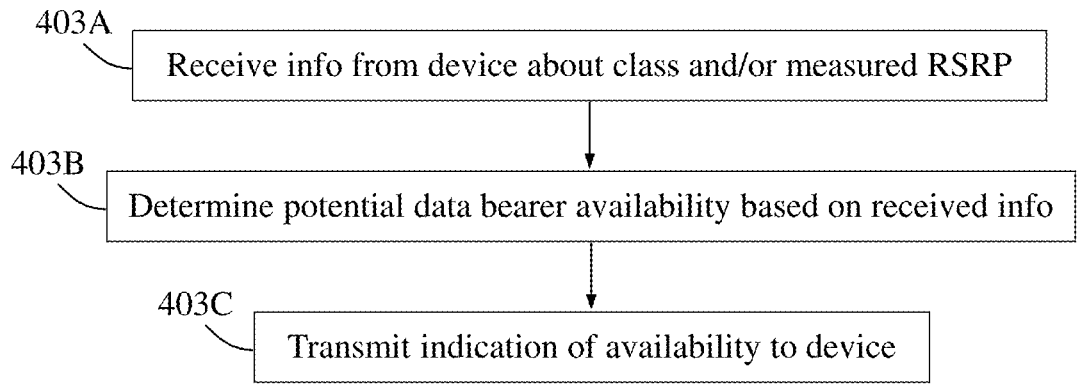
FIG. 4B is a flow chart illustrating an additional procedure in the network node which could be employed in the procedure of FIG. 4A, according to further example embodiments.

It was mentioned above that the wireless device 100 may transmit its device class and/or measurements of RSRP to the network node 102 which enables the network node 102 to do the availability determination. A procedure in the network node 102 where this is employed is illustrated by another flow chart in FIG. 4B comprising actions that may be executed at some point before action 404.

Another example embodiment may thus be that the network node 102 receives from the wireless device 100 information about its device class and/or measurements of RSRP at the wireless device, as shown in an action 403A. The network node 102 further determines whether the potential data bearer is available or not for the wireless device 100 based on the received information, in an action 403B, and transmits to the wireless device an indication that the potential data bearer is available or not in a further action 403C. The network node 102 may thus determine availability of the potential data bearer basically in the same manner as the wireless device 100 might do in the above-described action 304, i.e. using the received device-related information applied on the broadcasted system information.

In further example embodiments, in case the data is downlink data initiated by the network, the network node 102 may receive a paging message from a core node 104, the paging message indicating that the downlink data is of the potential data class. The network node 102 may then forward the paging message to the wireless device 100, or discard it in case the system information indicates that the potential data bearer is not available for the wireless device. In some cases, this received paging message can thus be discarded if the potential data class can be determined as not available for the wireless device, based on the configured system information.

In case the paging message is forwarded to the wireless device, some further example embodiments may be that no response to the paging message is received or that a page response message is received with an indication that the potential data bearer is not available. In either case, network node 102 will determine the potential data bearer to be unavailable for the wireless device and if the above page response message is received, it can be forwarded to the core node 104.

Hence, the network node 102 may determine availability of the potential data bearer based on the system information configured in action 400 and transmitted in action 402 and without using any information from the wireless device 100, for example when the system information indicates that the potential data bearer is currently available for all devices or not available for any device. If a paging message for the wireless device 100 is received from the core node 104 and the configured system information indicates that the potential data bearer is not available for the wireless device 100, the network node 102 can discard the paging message and not forward it to the wireless device 100.

An example of how the solution may be employed in terms of actions performed by a core node, such as the core node 104, is illustrated by the flow chart in FIG. 4C, which will now be described likewise with further reference to FIG. 2A. It should be noted that the procedure of FIG. 4C is valid for the case when downlink data is pending in the core node 104, i.e. in the network.

Figure 4C:
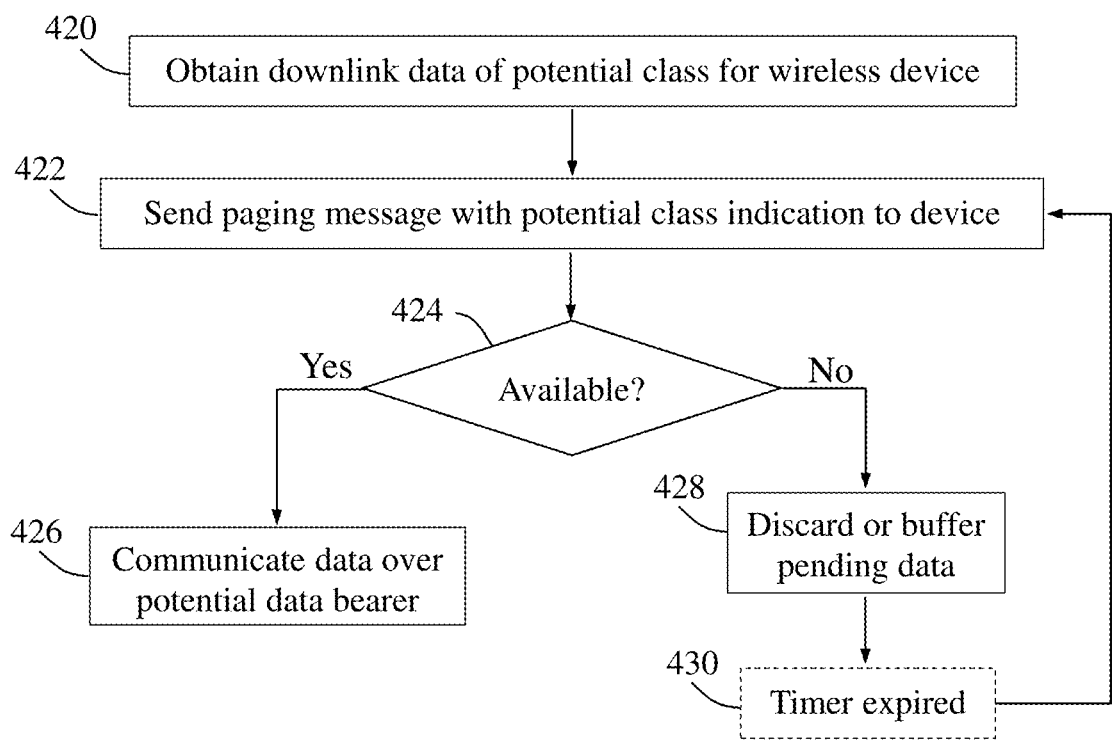
FIG. 4C is another flow chart illustrating a procedure in a core node, according to further example embodiments.
Figure 5:
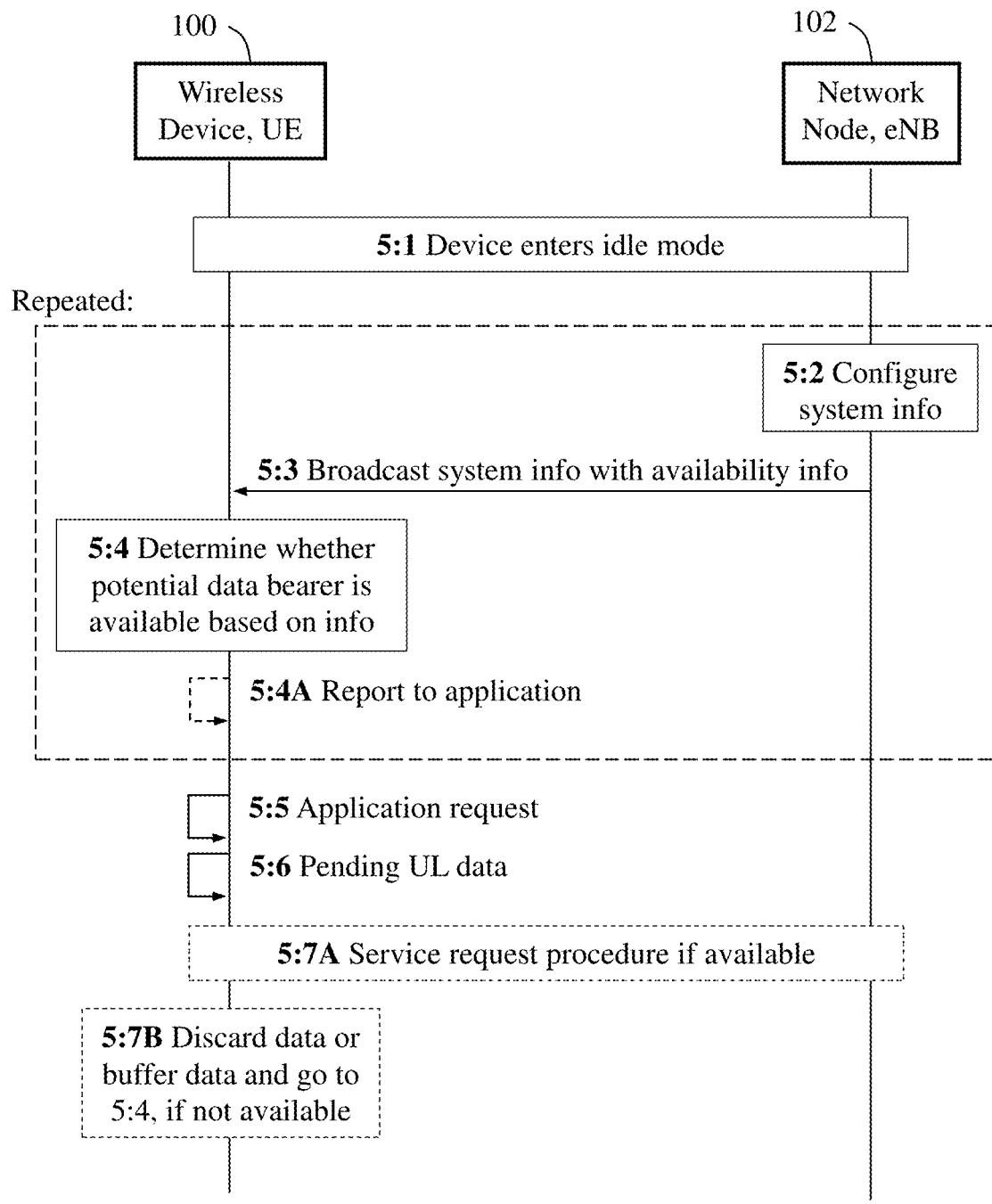
FIG. 5 is a signaling diagram illustrating an example of a procedure when the solution is used for uplink data, according to further example embodiments.
Figure 6:
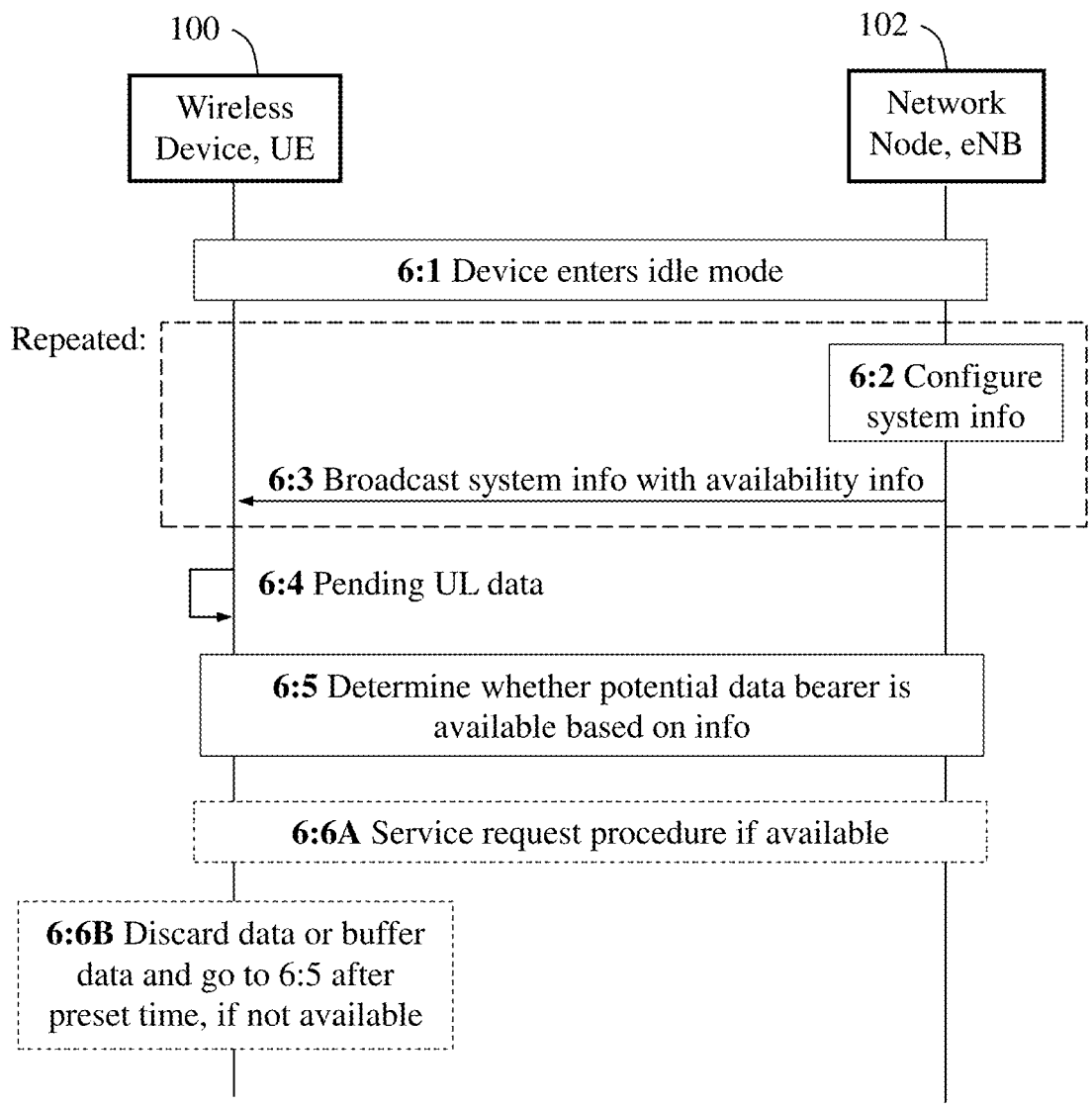
FIG. 6 is a signaling diagram illustrating another example of a procedure when the solution is used for uplink data, according to further example embodiments.
Figure 7:
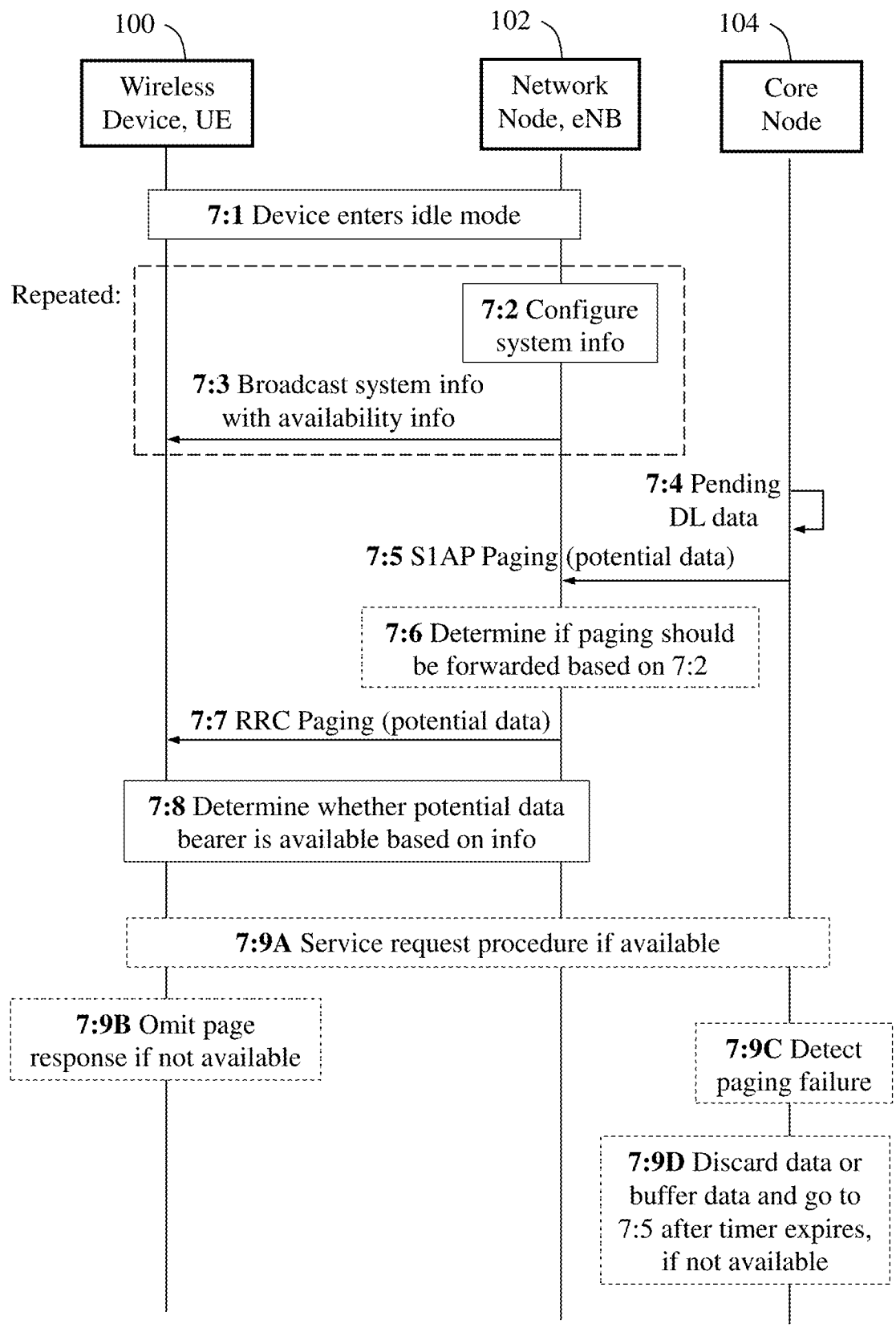
FIG. 7 is a signaling diagram illustrating an example of a procedure when the solution is used for downlink data, according to further example embodiments.
Figure 8:
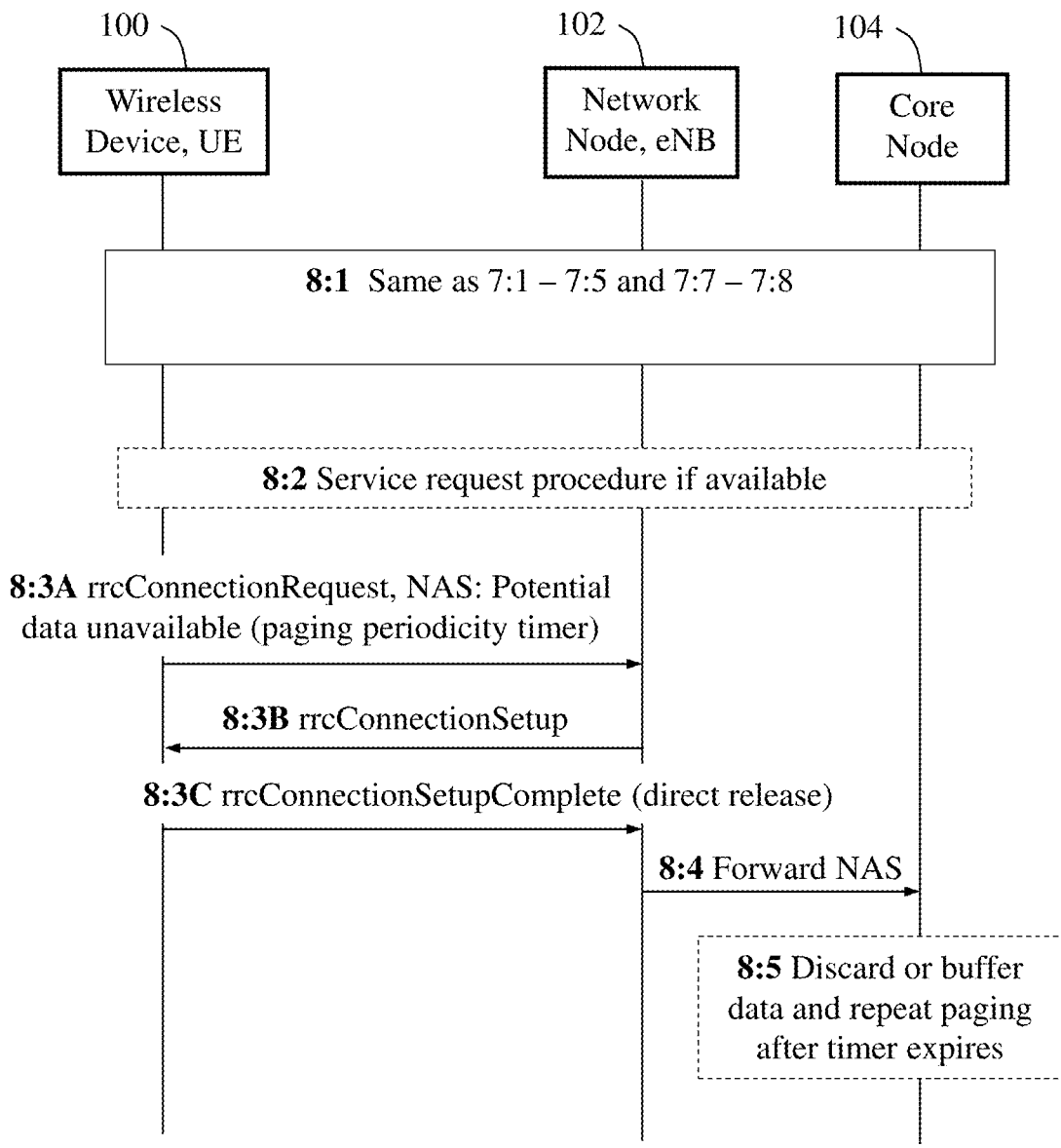
FIG. 8 is a signaling diagram illustrating another example of a procedure when the solution is used for downlink data, according to further example embodiments.

FIG. 4C thus illustrates a procedure in the core node 104 associated with a wireless network, for handling communication of data between a wireless device 100 and a network node 102 serving a cell of the wireless network. A first action 420 illustrates that the core node 104 obtains downlink data of a potential data class for the wireless device 100, the potential data class indicating that a certain delay for delivering the data can be tolerated. As a result, the core node 104 sends to the wireless device 100 a paging message indicating that the downlink data is of the potential data class, in another action 422.

According to regular procedures, pending downlink data will trigger the core node to initiate paging of the targeted wireless device. In the procedure of FIG. 4C, the core node 104 thus indicates in the paging message that the downlink data is of the potential data class, which will trigger the wireless device 100 to determine whether the potential data class is available or not, as described for action 304 above.

The core node 104 then detects whether the potential data bearer is available for communication of the data or not, in another action 424. This detection may be done in different ways to be described below. When detecting that the potential data bearer is available, the core node 104 will communicate the data with the wireless device over the potential data bearer, as shown in an action 426.

In some example embodiments, if the core node 104 does not receive any response to the paging message, or receives a page response message with an indication that the potential data bearer is not available, core node 104 detects the potential data bearer to be unavailable for the wireless device 100. In that case, the core node 104 may discard or buffer the downlink data in the core node.

When receiving the above page response message, another example embodiment may be that the received page response message comprises a paging periodicity timer instructing the core node 104 to wait with further paging to the wireless device caused by said pending downlink data until the paging periodicity timer has expired.

In the following description of FIGS. 5-8, the terms UE and eNB are used as examples of wireless device and network node, respectively.

It was mentioned above that the wireless device 100 may perform determination of potential data bearer availability repeatedly prior to detecting that uplink data is pending in the wireless device. A more detailed example where this is employed for communication of uplink data from a UE to an eNB, will now be described with reference to the signaling diagram in FIG. 5, involving the wireless device, UE 100 and the network node, eNB 102.

Action 5:1
The UE enters idle or inactive mode, e.g. after a period of data inactivity. After this action, there will be no dedicated bearer available between UE and eNB, such that no necessary information for determining potential bearer availability (e.g. CQI) can be transmitted from UE to eNB.

Action 5:2
System information related to availability of the potential data bearer is configured by the eNB. In this example, the eNB will continuously or regularly determine one or more potential data bearer thresholds for the cell, based on the current situation in the cell and in the neighborhood of the cell, such as in neighboring cells. The situation could be related to "number of active user with different UE class in the cell and neighboring cells", "available bandwidth in the cell and neighboring cells", "traffic load with different QoS class in the cell and/or in the neighboring cells".

The result of this determination could be a number of "Potential data bearer thresholds", e.g. related to if potential data is on/off for this cell, RSRP threshold for potential data bearer usage, valid UE class for using potential data bearer, etc. These potential data bearer thresholds could be common for both UL (uplink) and DL (downlink) potential data class, or there could be separate thresholds for UL and DL potential data class, respectively.

Action 5:3
The eNB broadcasts the "Potential data thresholds" through a broadcast channel. This new broadcast information could be implemented as an extension of current SIB, or a new SIB type, herein denoted SIBx.

Action 5:4
The UE will continuously determine if UL/DL data of the potential data class is allowed to be transmitted, by using the received broadcast information from step 3 together with its own UE class, a measured RSRP value of the cell, etc.

Action 5:4A
After each determination, or after a certain number of determinations in 5:4, the UE may report the resulting potential data bearer availability to a UE application in the UE, not shown, which application may generate potential data to be transmitted from the UE.

As indicated in the figure, actions 5:2-5:4 (5:4A) are repeated to keep the system information and the resulting potential data bearer availability up-to-date depending on changing conditions.

Action 5:5
The UE application requests the UE for availability of potential data bearer, when UE application wants to transmit UL potential data which may contain UL application data or a request for DL application data towards a server or the like.

Action 5:6
The UE detects pending potential UL data. In this action the UE also responds to the request from UE application in 5:5, based on the latest determination done in 5:4.

Action 5:7A
If the UE application is allowed to use potential data class, it will start providing UL data, e.g. comprising UL application data or a request for DL application data. In this case, the UE application will thus request the UE to transmit UL data through the potential data bearer and the service request procedure will be executed which means that the UE enters the connected state.

Action 5:7B
As an alternative to action 5:7A, the UE has determined that potential data cannot be transmitted according to the latest result of 5:4 above. Thus when the UE application requests the UE to transmit UL data through the potential data bearer, the UL data will not be transmitted. The result of this is that the service request procedure, which consumes radio resources, can be avoided and 5:7A is thus not executed. The UE can either discard this UL data, or buffer it until determination in 5:4 allows potential data transmission. The UE may thus return to action 5:4 at this point.

It was mentioned above that the wireless device 100 may perform determination of potential data bearer availability after detecting that uplink data is pending in the wireless device. A more detailed example where this is employed for communication of uplink data, will now be described with reference to the signaling diagram in FIG. 6, likewise involving the UE 100 and the eNB 102.

Action 6:1
Same as action 5:1 above.

Action 6:2
Same as action 5:2 above.

Action 6:3
Same as action 5:3 above but optional. Actions 6:2 and 6:3 are repeated at regular intervals.

Action 6:4
The UE receives data from the UE application for transmission towards the network, indicating that potential data class should be used. This indication can be any of:
 a. The UE application explicitly requests the UL data should be transmitted over the potential data bearer, which data may comprise UL application data or a request for DL application data.

b. The UE application indicates that in connection to UL data transmission that the UE application is requesting DL data to be transmitted through the potential data bearer.

c. The UE application queries the UE if UL and/or DL data can be transmitted through potential data bearer, which results in a response from the UE to the UE application.

Action 6:5

The UE 100, or the UE together with eNB 102, determines whether the potential data class is available or not, by performing one of the following three alternatives:

i. The UE uses the received broadcast information from 5:3, together with its own UE class, the measured RSRP value of the cell, etc.

ii. If not reading system information in action 6:3, the UE requests potential data thresholds from the eNB, e.g. in a random access procedure or through dedicated RRC messages, and use these requested thresholds together with its own UE class, the measured RSRP value of the cell etc., to determine the potential data bearer availability.

iii. The UE transmits its own UE class, the measured RSRP value of the cell etc. to eNB in e.g. RACH procedure, or through dedicated RRC messages. The eNB then uses this information together with the potential data thresholds from 6:2 for determination of potential data bearer availability and responds the result to UE.

Action 6:6A

If the potential data class can be transmitted according to the outcome of 6:5 above, the service request procedure will be executed and the UE 100 enters the connected mode, as in 5:7A above.

Action 6:6B

As an alternative to action 6:6A, If the potential data class cannot be transmitted according to 6:5 above, the pending UL data will not be transmitted and the service request procedure, which consumes radio resources, can then be avoided. The UE 100 can either discard the pending UL data, or buffer it and make a new determination according to 6:5 above, e.g. after a predefined timer, "potential data determination period timer", expires.

It was mentioned above that when receiving a paging message for pending downlink data, the wireless device 100 may omit a response to the paging message, to indicate that the potential data bearer is not available. A more detailed example where this is employed for communication of downlink data, will now be described with reference to the signaling diagram in FIG. 7, involving the wireless device, UE 100 the network node, eNB 102 and the core node 104 shown in FIG. 2.

Action 7:1

Same as action 5:1 above.

Action 7:2

Same as action 5:2 above.

Action 7:3

Same as action 5:3 above. Actions 7:2 and 7:3 are repeated at regular intervals.

Action 7:4

The core node 104 receives DL data for transmission towards UE, and potential data class is selected for the transmission Action 7:5

The core node will send a paging signal towards the RAN network according to current standard, e.g. through S1AP in LTE, but with an extension indicating that the reason for paging is a DL transmission of potential data. This can be made by either adding an extended information element in the current paging signal, or by sending a new S1AP paging signal.

Action 7:6

Optionally, the eNB 102 may determine if the paging message should be forwarded to UE 100 over the air or not at all, based on the system information configured in action 7:2, e.g. based on one or more of the "potential data thresholds" described above for action 5:2. In that case, the following actions will be omitted.

Action 7:7

The eNB 102 will forward the paging message from CN to the cells through RRC signaling, including the extension made in 7:5 to indicate the paging is caused by potential data transmission.

Action 7:8

Same as action 6:5 above.

Action 7:9A

Same as action 5:7A or 6:6A above but applied for downlink data, if the potential data bearer is available in 7:8.

Action 7:9B

If the potential data bearer is not available in 7:8, the UE 100 will indicate to the core node 104 that the downlink data should not be transmitted, by omitting a page response to the core node 104. As a result, the service request procedure, which consumes radio resources, will not be executed. It should be noted that if UE does not respond to the paging, the handling of paging related timers (e.g. periodic TAU timer in reachability management for UE in ECM-IDLE state according to TS 23.401 chapter 4.3.5.2) should be treated as if this paging request has never been received by the UE.

Action 7:9C

The core node 104 detects a paging failure, meaning that the downlink potential data cannot be transmitted since no paging response is received before a prescribed timeout.

Action 7:9D

The core node 104 will follow the current 3GPP procedure (TS 23.401 chapter 5.3.4.3), to keep the UE 100 in ECM IDLE state. For the pending potential data, core node 104 can either follow the 3GPP standard and discard the potential data, or buffer the data. A new timer "potential data paging periodicity timer" is introduced for avoiding a paging storm caused by pending downlink potential data. No potential data paging is allowed before this timer has expired. When it expires without receiving a paging response, core node 104 can return to 7:5 and send another paging signal.

It was further mentioned above that when receiving a paging message for pending downlink data, the wireless device 100 may send a page response message with an indication that the potential data bearer is not available. A more detailed example where this is employed for communication of downlink data, will now be described with reference to the signaling diagram in FIG. 8, again involving the wireless device 100 the network node 102 and the core node 104 shown in FIG. 2.

Action 8:1

Same as actions 7:1-7:5 and 7:7-7:8 above, thus omitting action 7:6.

Action 8:2

Same as action 7:9A above.

Actions 8:3A-C

If the UE 100 determines that the potential data bearer is not available according to the result of 8:1 (i.e. 7:8=6:5) above, the UE will setup an RRC connection by performing actions 8:3A-C, for transmitting a paging response to the core node 104. The extension "NAS: Potential data unavailable (paging periodicity timer)" is added, i.e. effectively "piggy backed", in the rrcConnectionRequest of 8:3A. In order to minimize the air interface usage, an additional information element "(direct release)" can also be added in the rrcConnectionSetupComplete of 8:3C, to indicate that this RRC connection can immediately be released after the "piggy backed" NAS message of 8:3A has been delivered.
Action 8:4

The eNB 102 forwards the NAS message of 8:3A with availability indication to the core node 104. This is thus new message created for potential data paging response from UE to core node 104, indicating potential data transmission is not available. Optionally, an additional information element denoted "(paging periodicity timer)" or "(potential data paging periodicity timer)" can also be transmitted to the core node 104 to limit the amount of paging messages from the core node 104.
Action 8:5

At this point, the core node 104 can follow the current 3GPP procedure used when no paging response is received from UE (TS 23.401 chapter 5.3.4.3), i.e. keep the UE in ECM_IDLE state. The core node 104 can either discard the pending DL potential data, which is standard for the procedure, or buffer the data for the time being. The above "potential data paging periodicity timer" may be applied for avoiding a paging storm caused by the pending DL potential data. No DL potential data paging is thus allowed before this timer is expired.

Figure 9:
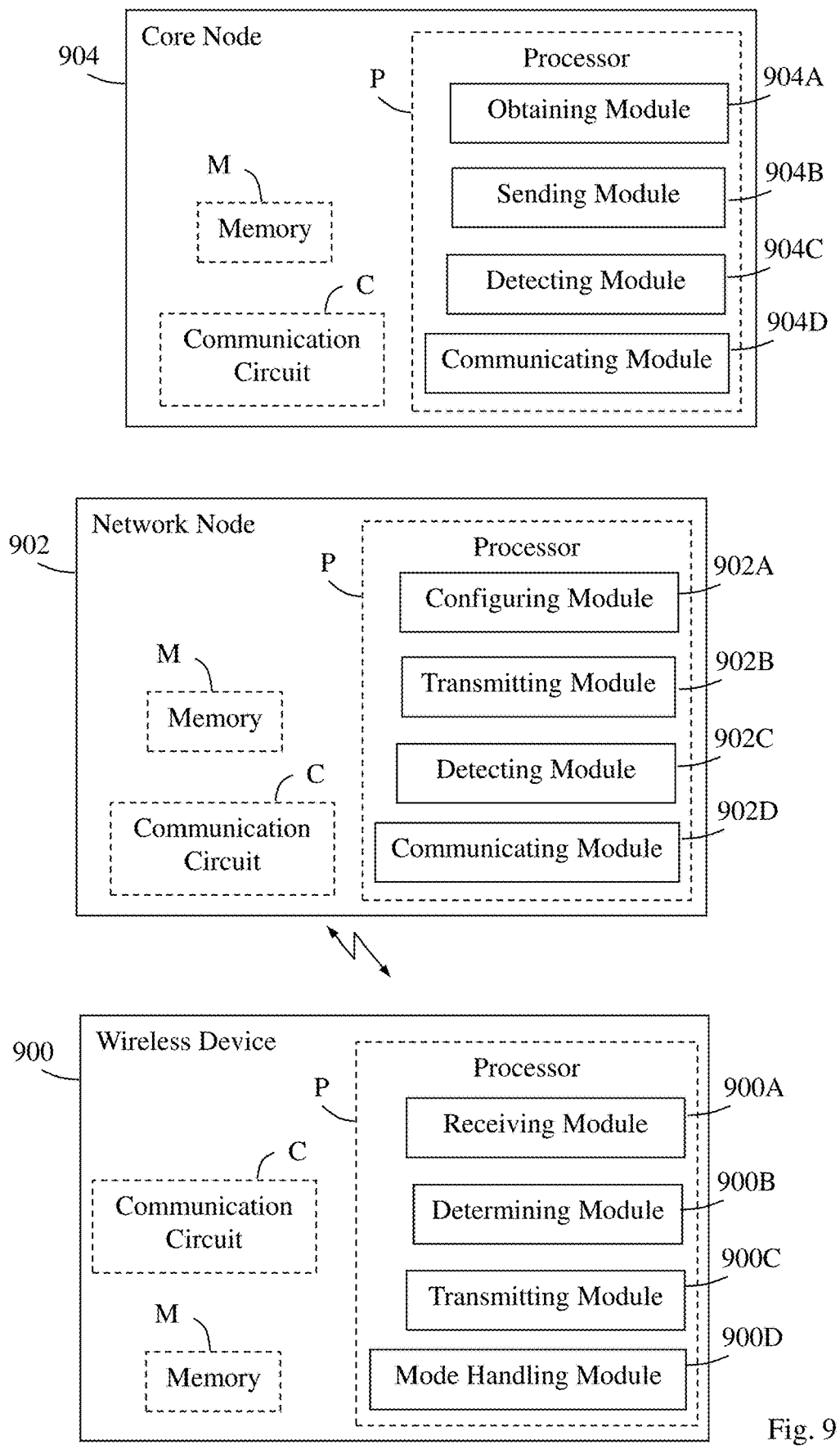
FIG. 9 is a block diagram illustrating how a wireless device, a network node and a core node may be structured, according to further example embodiments.

The block diagram in FIG. 9 illustrates a detailed but non-limiting example of how a wireless device 900, a network node 902 and a core node 904, respectively, may be structured to bring about the above-described solution and embodiments thereof. In this figure, the wireless device 900, the network node 902 and the core node 904 may be configured to operate according to any of the examples and embodiments of employing the solution as described herein, where appropriate. In this figure, the wireless device 900 is thus operable such as the above-described wireless device 100, the network node 902 is operable such as the above-described network node 102, and the core node 904 is operable such as the above-described core node 104.

Each of the wireless device 900, the network node 902 and the core node 904 is shown to comprise a processor "P", a memory "M" and a communication circuit "C" with suitable equipment for sending and receiving information and messages in the manner described herein. Further, the wireless device 900 and the network node 902 are equipped with suitable radio circuits, not shown, for transmitting and receiving radio signals in the communication described herein.

The communication circuit C in each of the wireless device 900, the network node 902 and the core node 904 thus comprises equipment configured for communication with each other using suitable technologies and protocols for the communication depending on the implementation. The solution is however not limited to any specific types of technologies and protocols.

The wireless device 900 is, e.g. by means of units, modules or the like, configured or arranged to perform at least some of the actions 300-314 of the flow chart in FIG. 3 and as follows. Further, the network node 902 is, e.g. by means of units, modules or the like, configured or arranged to perform at least some of the actions 400-408, 403A-403C of the flow charts in FIGS. 4A, 4B and as follows. Further, the core node 904 is, e.g. by means of units, modules or the like, configured or arranged to perform at least some of the actions 420-430 of the flow chart in FIG. 4C and as follows.

The wireless device 900 is arranged to handle communication of data between the wireless device and a network node 902 serving a cell of a wireless network. When the wireless device is in idle or inactive mode it is configured to receive system information from the network node 902, which information is related to availability of a potential data bearer dedicated for data of a potential data class. The potential data class indicates that a certain delay for delivering the data can be tolerated. This receiving operation may be performed by a receiving module 900A in the wireless device 900, and as illustrated in action 302.

The wireless device 900 is also configured to determine whether the potential data bearer is available for communication of the data or not, based on the received system information. This operation may be performed by a determining module 900B in the wireless device 900, and as illustrated in action 304.

When finding that the potential data bearer is available for communication of the data, the wireless device 900 is further configured to transmit a message of a service request procedure to the network node, which message initiates a transition from the idle or inactive mode to a connected mode, as illustrated in action 308. In that case, the wireless device 900 is also configured to communicate the data with the network node over the potential data bearer while the wireless device is in the connected mode. This transmitting operation may be performed by a transmitting module 900C in the wireless device 900, and as illustrated in action 310.

On the other hand, when finding that the potential data bearer is not available for communication of the data, the wireless device 900 is further configured to stay in the idle or inactive mode, which may be accomplished by a mode handling module 900D in the wireless device 900, and as illustrated in action 312. The mode handling module 900D may also be responsible for the above-mentioned transition of the wireless device 900 from idle/inactive mode to connected mode in case the potential data bearer is found to be available.

The network node 902 is arranged to handle communication of data between the network node and a wireless device 900 when serving a cell of a wireless network. The network node 902 is configured to set or configure system information related to availability of a potential data bearer dedicated for data of a potential data class which indicates that a certain delay for delivering the data can be tolerated. This operation may be performed by a configuring module 902A in the network node 902 and as illustrated in action 400. The network node 902 is also configured to transmit the system information in the cell, which may be performed by a transmitting module 902B in the network node 902 and as illustrated in action 402.

The network node 902 is also configured to detect whether a message of a service request procedure has been received from the wireless device that initiates a transition from the idle or inactive mode to a connected mode of the wireless device. This operation may be performed by a detecting module 902C in the network node 902 and as illustrated in action 404. The network node 902 is also configured to communicate the data with the wireless device over the potential data bearer when detecting that such a message of a service request procedure has been received and the wireless device is in the connected mode. This operation may be performed by a communicating module 902D in the network node 902 and as illustrated in action 406.

If no such message is detected, the network node 902 may be configured to not communicate the data with the wireless device at this point, at least not over the potential data bearer. As described above, the data could be communicated over the potential data bearer at some later point once the potential data bearer becomes available and the wireless device enters the connected mode and initiates a service request procedure.

The core node 904 is associated with a wireless network and arranged to handle communication of data between a wireless device 900 and a network node 902 serving a cell of the wireless network. The core node 904 is configured to obtain downlink data of a potential data class for the wireless device 900, the potential data class indicating that a certain delay for delivering the data can be tolerated, which operation may be performed by an obtaining module 904A in the core node 904, and as illustrated in action 420. The core node 904 is also configured to send to the wireless device 900 a paging message indicating that the downlink data is of the potential data class. This operation may be performed by a sending module 904B in the core node 904, and as illustrated in action 422.

The core node 904 is further configured to detect whether the potential data bearer is available for communication of the data or not. This operation may be performed by a detecting module 904C in the core node 904, and as illustrated in action 424. Some examples of how the core node 104 might detect whether the potential data bearer is available or not have been described above. The core node 904 is also configured to communicate the data with the wireless device 900 over the potential data bearer when detecting that the potential data bearer is available. This operation may be performed by a communicating module 904D in the core node 904, and as illustrated in action 426. When detecting that the potential data bearer is not available, the core node 904 may be configured to discard or buffer the data, as described above for action 428.

It should be noted that FIG. 9 illustrates various functional units in the wireless device 900, the network node 902 and the core node 904, respectively, and the skilled person is able to implement these functional modules in practice using suitable software and hardware equipment. Thus, the solution is generally not limited to the shown structures of the wireless device 900, the network node 902 and the core node 904, and the functional modules therein may be configured to operate according to any of the features, examples and embodiments described in this disclosure, where appropriate.

The functional modules or units 600A-C, 602A-C, 604A-B, and 606A-C described above may be implemented in the wireless device 900, the network node 902 and the core node 904, respectively, by means of program modules of a respective computer program comprising code means which, when run by the processor P causes the wireless device 900, the network node 902 and the core node 904 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the wireless device 900, the network node 902 and the core node 904 in the form of a memory having a computer readable medium and being connected to the processor P. The computer program product or memory M in each of the wireless device 900, the network node 902 and the core node 904 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective wireless device 900, network node 902 and core node 904.

The solution described herein may be implemented in each of the respective wireless device 900, network node 902 and core node 904 by a computer program comprising instructions which, when executed on at least one processor, cause the at least one processor to carry out the actions according to any of the above embodiments and examples, where appropriate. The solution may also be implemented at each of the wireless device 900, the network node 902 and the core node 904 in a program carrier containing the above computer program, wherein the program carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "wireless device", "network node", "core node", "potential data bearer", "potential data class", "system information", "cost related parameter", "transition message" and "network cost" have been used throughout this disclosure, although any other corresponding entities, functions, and/or parameters could also be used having the features and characteristics described here. The solution is defined by the appended claims.

The invention claimed is:

1. A method performed by a wireless device for handling communication of data between the wireless device and a network node serving a cell of a wireless network, the method comprising:
   receiving from the network node when the wireless device is in an idle or inactive mode, system information related to availability of a potential data bearer dedicated for data of a potential data class which indicates that a certain delay for delivering the data can be tolerated, wherein the data comprises uplink data initiated by the wireless device;
   determining whether the potential data bearer is available for communication of the data or not, based on the received system information, wherein said determining whether the potential data bearer is available is performed after detecting that the uplink data is pending in the wireless device and wherein the wireless device determines whether the potential data bearer is available or not by transmitting its device class and/or measurements of RSRP at the wireless device to the network node, and receiving from the network node an indication that the potential data bearer is available or not; and
   transmitting to the network node, when the potential data bearer is available for communication of the data, a message of a service request procedure that initiates a transition from the idle or inactive mode to a connected mode, and communicating the data with the network node over the potential data bearer when the wireless device is in the connected mode, and staying in the idle or inactive mode when the potential data bearer is not available for communication of the data, wherein the data comprises downlink data initiated by the wireless network, a paging message is received from a core node associated with the wireless network, the paging message indicates that a paging is caused by pending downlink data of the potential data class, said staying in the idle or inactive mode when the potential data bearer is not available comprises sending a page response message to the core node with an indication that the potential data bearer is not available.

2. A method according to claim 1, wherein said system information comprises at least one of: a threshold value of Reference Signal Received Power, RSRP, indicating that the potential data bearer is available when the threshold value is exceeded; an indication that the potential data bearer is available for one or more classes of wireless devices; and an indication that the potential data bearer is available to any wireless device located in a cell served by the network node.

3. A method according to claim 2, wherein said determining whether the potential data bearer is available comprises checking whether measurements of RSRP at the wireless device exceed said threshold value of RSRP.

4. A method according to claim 1, wherein said staying in idle or inactive mode when the potential data bearer is not available further comprises omitting a response to the paging message.

5. A method according to claim 4, wherein the page response message comprises a paging periodicity timer instructing the core node to wait with further paging to the wireless device caused by said pending downlink data until the paging periodicity timer has expired.

6. A wireless device arranged to handle communication of data between the wireless device and a network node serving a cell of a wireless network, the wireless device comprising: processing circuitry; and memory coupled to the processing circuitry and having instructions stored therein that are executable by the processing circuitry to cause the wireless device to perform operations, the operations comprising: receive from the network node when the wireless device is in an idle or inactive mode, system information related to availability of a potential data bearer dedicated for data of a potential data class which indicates that a certain delay for delivering the data can be tolerated, wherein the data comprises uplink data initiated by the wireless device; determine whether the potential data bearer is available for communication of the data or not, based on the received system information, wherein the wireless device is configured to perform said determining whether the potential data bearer is available after detecting that the uplink data is pending in the wireless device and wherein the wireless device is configured to determine whether the potential data bearer is available or not by transmitting its device class and/or measurements of RSRP at the wireless device to the network node, and receiving from the network node an indication that the potential data bearer is available or not; and transmit to the network node, when the potential data bearer is available for communication of the data, a message of a service request procedure that initiates a transition from the idle or inactive mode to a connected mode, and to communicate the data with the network node over the potential data bearer when the wireless device is in the connected mode, and stay in the idle or inactive mode when the potential data bearer is not available for communication of the data, wherein the data comprises downlink data initiated by the wireless network, a paging message is received from a core node associated with the wireless network, the paging message indicates that a paging is caused by pending downlink data of the potential data class, said staying in the idle or inactive mode when the potential data bearer is not available comprises sending a page response message to the core node with an indication that the potential data bearer is not available.

7. A wireless device according to claim 6, wherein said staying in idle or inactive mode when the potential data bearer is not available, further comprises omitting a response to the paging message.

8. A wireless device according to claim 7, wherein the page response message comprises a paging periodicity timer instructing the core node to wait with further paging to the wireless device caused by said pending downlink data until the paging periodicity timer has expired.

9. A method performed by a network node serving a cell of a wireless network, for handling communication of data between the network node and a wireless device, the method comprising: configuring system information related to availability of a potential data bearer dedicated for data of a potential data class which indicates that a certain delay for delivering the data can be tolerated, wherein the data comprises uplink data initiated by the wireless device; transmitting the system information in the cell; detecting whether a message of a service request procedure has been received from the wireless device that initiates a transition from an idle or inactive mode to a connected mode of the wireless device; communicating the data with the wireless device over the potential data bearer when detecting that said message has been received and the wireless device is in the connected mode; receiving from the wireless device information about its device class and/or measurements of RSRP at the wireless device; determining whether the potential data bearer is available or not for the wireless device based on the received information; and transmitting to the wireless device an indication that the potential data bearer is available or not, wherein the data comprises downlink data initiated by the wireless network, a paging message is received from a core node associated with the wireless network, the paging message indicates that a paging is caused by pending downlink data of the potential data class, causing the wireless device to stay in the idle or inactive mode when the potential data bearer is not available comprises sending a page response message to the core node with an indication that the potential data bearer is not available.

10. A method according to claim 9, wherein said system information comprises at least one of: a threshold value of Reference Signal Received Power, RSRP, indicating that the potential data bearer is available when the threshold value is exceeded; an indication that the potential data bearer is available for one or more classes of wireless devices; and an indication that the potential data bearer is available to any wireless device located in a cell served by the network node.

11. A method according to claim 9, wherein the system information is configured based on at least one of: the number of active devices in the cell, the number of active devices in one or more neighbouring cells, available bandwidth and/or network resources in the cell, available bandwidth in one or more neighbouring cells, traffic load in the cell, and traffic load in one or more neighbouring cells.

12. A method according to claim 9, wherein
the paging message is discarded in case the system information indicates that the potential data bearer is not available for the wireless device and wherein further when no response to the paging message is received, the potential data bearer is determined to be unavailable for the wireless device.

13. A network node arranged to handle communication of data between the network node and a wireless device when serving a cell of a wireless network, the network node comprising: processing circuitry; and memory coupled to the processing circuitry and having instructions stored therein that are executable by the processing circuitry to cause the network node to perform operations, the operations comprising: configure system information related to availability of a potential data bearer dedicated for data of a potential data class which indicates that a certain delay for delivering the data can be tolerated, wherein when the data comprises uplink data initiated by the wireless device; transmit the system information in the cell; detect whether a message of a service request procedure has been received from the wireless device that initiates a transition from an idle or inactive mode to a connected mode of the wireless device; communicate the data with the wireless device over the potential data bearer when detecting that said message has been received and the wireless device is in the connected mode; receive from the wireless device information about its device class and/or measurements of RSRP at the wireless device; determine whether the potential data bearer is available or not for the wireless device based on the received information; and transmit to the wireless device an indication that the potential data bearer is available or not, wherein the data comprises downlink data initiated by the wireless network, a paging message is received from a core node associated with the wireless network, the paging message indicates that a paging is caused by pending downlink data of the potential data class, causing the wireless device to stay in the idle or inactive mode when the potential data bearer is not available comprises sending a page response message to the core node with an indication that the potential data bearer is not available.

14. A network node according to claim 13, wherein the paging message is discarded in case the system information indicates that the potential data bearer is not available for the wireless device and wherein further when no response to the paging message is received the potential data bearer is determined to be unavailable for the wireless device.

15. A method performed by a core node associated with a wireless network, for handling communication of data between a wireless device and a network node serving a cell of the wireless network, the method comprising: obtaining downlink data of a potential data class for the wireless device, the potential data class indicating that a certain delay for delivering the data can be tolerated; sending to the wireless device a paging message indicating that the downlink data is of the potential data class; detecting whether the potential data bearer is available for communication of the data or not; and communicating the data with the wireless device over the potential data bearer when detecting that the potential data bearer is available, wherein the downlink data is initiated by the wireless network, the paging message is received from the core node, the paging message indicates that a paging is caused by pending downlink data of the potential data class, causing the wireless device to stay in an idle or inactive mode when the potential data bearer is not available comprises sending a page response message to the core node with an indication that the potential data bearer is not available.

16. A method according to claim 15, wherein further when no response to the paging message is received, the potential data bearer is detected to be
    unavailable for the wireless device and the downlink data is discarded or buffered in the core node.

17. A method according to claim 16, wherein the received page response message comprises a paging periodicity timer instructing the core node to wait with further paging to the wireless device caused by said pending downlink data until the paging periodicity timer has expired.

18. A core node associated with a wireless network and arranged to handle communication of data between a wireless device and a network node serving a cell of the wireless network, the core node comprising: processing circuitry; and memory coupled to the processing circuitry and having instructions stored therein that are executable by the processing circuitry to cause the core node to perform operations, the operations comprising: obtain downlink data of a potential data class for the wireless device, the potential data class indicating that a certain delay for delivering the data can be tolerated; send to the wireless device a paging message indicating that the downlink data is of the potential data class; detect whether the potential data bearer is available for communication of the data or not; and communicate the data with the wireless device over the potential data bearer when detecting that the potential data bearer is available, wherein the downlink data is initiated by the wireless network, the paging message is received from the core node, the paging message indicates that a paging is caused by pending downlink data of the potential data class, causing the wireless device to stay in an idle or inactive mode when the potential data bearer is not available comprises sending a page response message to the core node with an indication that the potential data bearer is not available.

19. A core node according to claim 18, wherein further when no response to the paging message is received, the core node is configured to detect the potential data bearer to be unavailable for the wireless device and to discard or buffer the downlink data in the core node.

20. A core node according to claim 19, wherein the received page response message comprises a paging periodicity timer instructing the core node to wait with further paging to the wireless device caused by said pending downlink data until the paging periodicity timer has expired.

* * * * *